US005570003A

United States Patent [19]
Zimmermann

[11] Patent Number: 5,570,003
[45] Date of Patent: Oct. 29, 1996

[54] SWITCHING DEVICE WITH A FEEDING CIRCUIT FOR DC POWER SUPPLY TO A SUBSCRIBER'S TERMINAL UNIT

[75] Inventor: Andreas Zimmermann, Nürnberg, Germany

[73] Assignee: U.S. Philips Corporation, New York, N.Y.

[21] Appl. No.: 423,245

[22] Filed: Apr. 13, 1995

[30] Foreign Application Priority Data

Apr. 14, 1994 [DE] Germany ............... 44 12 811.8

[51] Int. Cl.$^6$ ............................................. G05F 1/40
[52] U.S. Cl. ..................... 323/284; 323/282; 361/119; 379/412
[58] Field of Search ................. 323/276, 277, 323/282, 284; 361/119; 379/412

[56] References Cited

U.S. PATENT DOCUMENTS

| | | | |
|---|---|---|---|
| 4,661,879 | 4/1987 | Sato et al. | 361/58 |
| 4,876,620 | 10/1989 | Borkowicz | 379/412 |
| 4,897,872 | 1/1990 | Siligoni et al. | 379/412 |
| 5,315,653 | 5/1994 | Siligoni et al. | 379/413 |

FOREIGN PATENT DOCUMENTS 2186763 8/1987 United Kingdom.

OTHER PUBLICATIONS

European Telecommunication Standard ETS 300 012, pp. 155 to 167 Apr. 1992.

*Primary Examiner*—Stuart N. Hecker
*Attorney, Agent, or Firm*—Michael E. Marion

[57] ABSTRACT

The invention relates to a switching device comprising at least one feeding circuit provided for DC power supply to at least one subscriber's terminal unit. The feeding circuit is especially provided for digital subscribers' terminal units. The invention furthermore relates to the feeding circuit used. There is proposed to provide a first and a second limiting circuit. The first limiting circuit comprises a first series combination of a first supply transistor arrangement and a first supply resistor arrangement to limit a supply current flowing through the first series combination. The second limiting circuit comprises a second series combination of a second supply transistor arrangement and a second supply resistor arrangement to limit a supply current (Is) flowing through the second series combination. A potential (V0) present on the control input of the second supply transistor arrangement depends on the voltage (Ur) present on the first series combination.

11 Claims, 2 Drawing Sheets

SWITCHING DEVICE WITH A FEEDING CIRCUIT FOR DC POWER SUPPLY TO A SUBSCRIBER'S TERMINAL UNIT

BACKGROUND OF THE INVENTION

1. Field of the Invention

The invention relates to a switching device comprising at least one feeding circuit, which feeding circuit is provided for DC power supply to at least one subscriber's terminal unit.

2. Discussion of the Related Art

If, in a fault condition of a DC power supply to a subscriber's terminal unit, excessive currents occur i.e. inadmissibly high supply currents which are caused, for example, by an overvoltage resulting from static charging or a short-circuit on the subscriber lines of the subscriber's terminal unit, there is a danger of a subscriber line being damaged (specially a fire on a subscriber line is to be avoided), or components of the switching device being damaged. For this reason, the feeding circuit is to include a protection against excessive currents.

British Patent Specification GB 2 186 763 A has stated for this purpose a protective circuit which includes a shunt as a protection against overvoltages on its output, which output is coupled to a subscriber's terminal unit. Overcurrents are sensed by two transistors which trigger a monostable in the case of overcurrent, so that this monostable turns off via a further monostable two field-effect transistors working as supply transistors. The field-effect transistors are thus used as controllable resistors and as switches via which a supply current for the subscriber's terminal unit flows.

SUMMARY OF THE INVENTION

It is an object of the invention to provide a switching device which includes a feeding circuit, which feeding circuit ensures a simple and cost-effective protection against overcurrents on the subscriber lines to the subscriber's terminal unit.

The object is achieved in that the feeding circuit comprises a first limiting circuit comprising a first series combination of a first supply transistor arrangement and a first supply resistor arrangement for limiting a supply current flowing through the first series combination, and a second limiting circuit comprising a second series combination of a second supply transistor arrangement and a second supply resistor arrangement for limiting a supply current flowing through the second series combination, while a potential present on the control input of the second supply transistor arrangement depends on a voltage present on the first series combination.

The DC current of the subscriber's terminal unit is supplied through two current paths. If a supply current flows through the subscriber's terminal unit, one of the current paths will be used as a forward supply line and the other current path as a return line for the supply current delivered by the feeding circuit. A limiting circuit for limiting the supply current is provided for either of the current paths. The limiting circuits are activated in the case of faults, for example, in the case of short-circuit or a high overvoltage on the subscriber lines, when the supply current exceeds a predeterminable threshold. In that case the supply current is reduced, because the transistor arrangements operating as controllable resistors and as switches in the limiting circuits are turned off. As the potential present on the control input of the second supply transistor arrangement depends on a voltage present on the first series combination, it is possible to tune the two limiting circuits to each other in a simple manner. For example, a substantially equal voltage drop on the first and second transistor arrangements is advantageous in the case of overcurrent. Any power dissipation is thus uniformly distributed over the two transistor arrangements. The maximum power dissipation for either of the supply transistor arrangements is thus minimized. This makes it possible to use transistors which are designed for low-level power dissipation and are thus cost-effective for the supply transistor arrangements.

To have the control voltage of the second supply transistor arrangement depend on the voltage present on the first series combination, a voltage divider connected in series to the first series combination is inserted between a first and a second reference potential. The centre terminal of the voltage divider is coupled to the control input of the second supply transistor arrangement.

As a result of this coupling, the second limiting circuit operates in dependence on the first limiting circuit. If the first transistor arrangement of the first series combination is turned off in the case of overcurrent, the voltage present on the first series combination will rise. In the embodiment according to the invention this leads to a changed potential present on the control input of the second supply transistor arrangement, so that consequent to the first transistor arrangement being turned off, also the second supply transistor arrangement is turned off in a simple manner. In the case of overcurrent, the voltages on the two supply transistor arrangements and the associated power dissipation are uniformly distributed over the two limiting circuits as a result of the coupling described above which can easily be realised by the voltage divider.

In another embodiment of the invention, a first limiting circuit comprises a first transistor whose control voltage depends on the voltage on the first supply resistor arrangement. The potential present on the control input of the first supply transistor arrangement depends on the voltage present on the first transistor.

If, in the case of overcurrent, the voltage on the first supply resistor arrangement used for sensing an overcurrent exceeds a variable threshold, the first transistor changes to the conducting mode. As the voltage present on the first transistor determines the control voltage of the first transistor arrangement, this transistor arrangement adopts the nonconducting mode and the supply current is lowered. Especially a destructive effect of an overcurrent caused by a short-circuit is avoided.

In a further embodiment, a third resistor is connected in parallel to the first transistor. In a parallel combination with the first transistor is connected a second transistor whose control voltage depends on the voltage on the first supply resistor arrangement, while the two transistors are decoupled by a diode. When there is a smaller supply current, the second transistor becomes conductive as the first transistor, and, when in the conducting mode, the second transistor counteracts a current flowing through the third resistor. In the case of an overcurrent, the charge of a capacitor is reversed via the parallel combination of the third resistor and the first transistor.

For overcurrents which are larger than a supply current in normal operation, but still below the threshold at which the first limiting circuit is activated because the first transistor becomes conductive, this arrangement causes the feeding circuit to be switched off in a delayed manner. For a period of time depending on the level of the overcurrent, the feeding circuit substantially maintains the overcurrent in that the charge of the capacitor is reversed via the third resistor whose voltage controls the first transistor arrangement. The first transistor arranged in parallel with the third resistor is turned off i.e. the first and thus also the second limiting circuit are not active. The overcurrent is supplied for a period of time by the feeding circuit until the capacitor current and thus the voltage on the third resistor have dropped so much that the first transistor arrangement starts to change to the turned-off mode. From this instant on, the supply current drops and follows the capacitor current as long as the overcurrent is still present. In this manner the feeding circuit is capable of supplying a brief overcurrent which flows, for example, when a subscriber's terminal unit is connected, to charge capacitors of the subscriber's terminal unit. Such an overcurrent limited in respect of time represents a case of normal operation and does not lead to the feeding circuit being switched off.

For the case where the overcurrent is so large that not only the second, but also the first transistor becomes conductive, and thus both limiting circuits are activated, the value of the supply current which is limited follows without delay the dropping capacitor current and falls off. In this manner an effective protection against very large overcurrents is guaranteed, which overcurrents occur, for example, in the event of a short-circuit on the subscriber lines. On the other hand, larger currents than the rated current of the feeding circuit can be supplied for a specific period of time.

In yet a further embodiment of the invention, a fourth resistor is connected in series to the capacitor and to the parallel combination formed by the third resistor and the first transistor. The period of time during which the capacitor current and thus the supply current drops can be simply adjusted in the case of overcurrent.

In still a further embodiment, a series combination of a fifth resistor and a diode whose cathode is connected in parallel to the capacitor terminal of the two capacitor terminals that has a smaller potential when the feeding circuit is in operation. During normal operation of the feeding circuit, a current flowing through the third resistor flows past the capacitor and across the fifth resistor and diode. If the second transistor is coupled to the junction between the fifth resistor and the diode, a current flowing through the fifth resistor will no longer flow via the diode through the third resistor, but be taken over by the second transistor in the case of overcurrent, when the second transistor becomes conductive. Therefore, this current can no longer turn on the first transistor arrangement by generating a voltage on the third resistor. The diode prevents the charging current of the capacitor also flowing off via the second transistor.

A sixth resistor for coupling the control input of the second transistor to a terminal of the first limiting circuit, which terminal is coupled to an output of the feeding circuit, causes the control voltage of the second transistor to depend on the voltage on the first series combination formed by the first transistor arrangement and the first supply resistor. In the case of overcurrent, a positive feedback effect arises. If, in the case of overcurrent, the first transistor arrangement changes to the turned-off mode, the voltage on the first series combination rises. Because of the coupling by the sixth resistor, the control voltage on the second transistor is increased, the control voltage of the first transistor arrangement is further reduced and the first transistor arrangement is turned off more rapidly. Furthermore, the sixth resistor ensures that, after the feeding circuit is switched off in the case of overcurrent, the second transistor receives an adequate control voltage, so that the first transistor arrangement and thus also the second transistor arrangement are maintained in the turned-off mode and the feeding circuit does not feed any supply current.

In a switching device arranged, for example, as a telecommunications system (digital exchange) with digital subscriber lines, external lines or tie trunks, it is advantageous that the feeding circuit can be switched on and off by a controller arranged in the switching device. An interface to which a digital subscriber's terminal unit can be connected (with supply) can be reconfigured, so that it can be connected to a network termination unit of a public network (without supply). Such a reconfiguration can thus be realised by merely changing the customer data. The reconfiguration of the hardware by means of switches or jumpers necessary thus far may be omitted.

It is furthermore advantageous that when the feeding circuit is switched off, this is signalled digitally. Digital signals of such a signalling can be used for executing further measures to protect the switching device or to eliminate errors. The signalling can be used for automatically switching the supply on again after a predetermined period of time or for generating an optical or acoustic warning signal, so that maintenance staff are warned that an error occurs in the switching device.

The invention further relates to a feeding circuit for DC power supply to a subscriber's terminal unit for a switching device that comprises
- a first limiting circuit which includes a first series combination of a first supply transistor arrangement and a first supply resistor arrangement for limiting a supply current flowing through the first series combination, and
- a second limiting circuit which includes a second series combination of a second supply transistor arrangement and a second supply resistor arrangement for limiting a supply current flowing through the second series combination, while a potential present on the control input of the second supply transistor arrangement depends on a voltage present on the first series combination.

BRIEF DESCRIPTION OF THE DRAWINGS

An exemplary embodiment of the invention will be further explained below with reference to the drawings, in which.

DETAILED DESCRIPTION OF THE PREFERRED EMBODIMENTS

Figure 1:
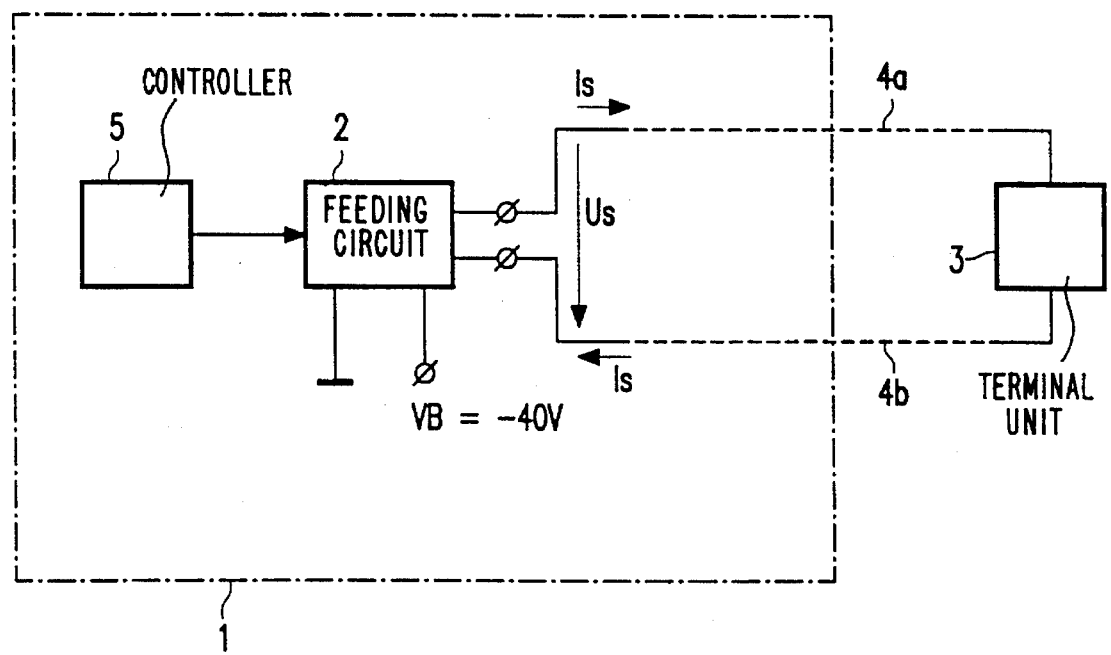
FIG. 1 shows a switching device with a connected subscriber's terminal unit.

The switching device 1 shown in FIG. 1—preferably a private branch exchange or telecommunications system (digital exchange) for digital subscribers' terminal units—comprises a feeding circuit 2 which is used for supplying power to at least one subscriber's terminal unit 3. FIG. 1 shows only a single connected subscriber's terminal unit 3. Further subscribers' terminal units are connected in parallel thereto. A first reference potential, in this case earth potential, is present on a first input of the feeding circuit 2. A second reference potential VB, for example, −40 V is present on a second input. The 40 V voltage thus present on the two inputs is conveyed into a supply voltage Us by the feeding circuit 2. The subscriber's terminal unit 3 can thus be supplied with a supply current Is. Feeding circuit 2 is used both for protecting subscriber lines 4a and 4b for two current paths for directing the supply current Is in forward and return directions, and for protecting components of the switching device 1 and of the subscriber's terminal unit 3 against overcurrents i.e. against impermissibly high supply currents Is in the case of a fault condition. The feeding circuit 2 is further coupled to a controller 5 whose function will be further explained below. Elements of the switching device which are not essential to the invention are not shown for clarity.

Figure 2:
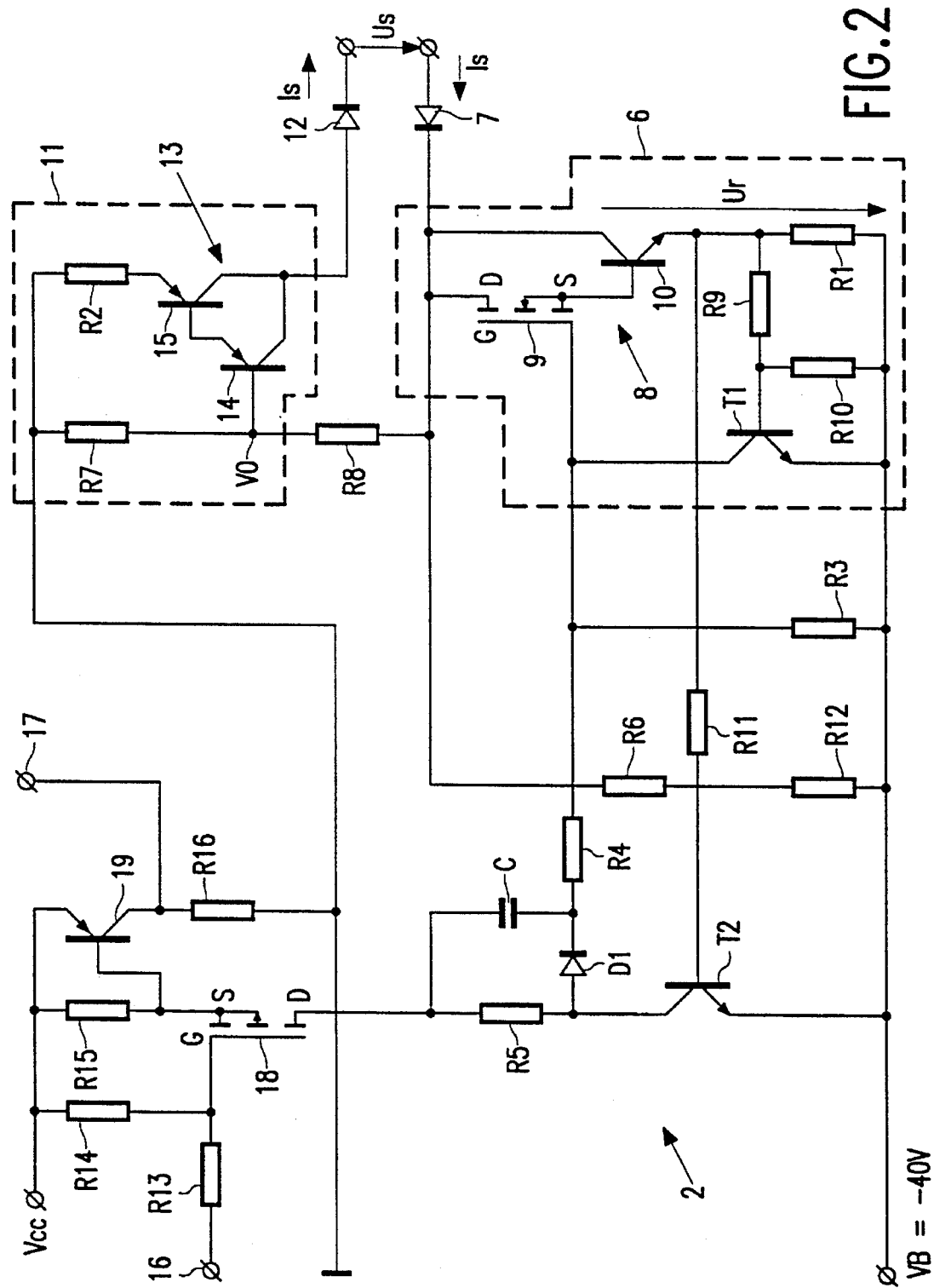
FIG. 2 shows a feeding circuit for DC power supply to the subscriber's terminal unit.

FIG. 2 shows the feeding circuit 2 of FIG. 1 in detail. One limiting circuit each is provided for the two DC current paths between feeding circuit 2 and subscriber's terminal unit 3, while the supply current Is flows through these paths. The first limiting circuit 6 lies between reference potential VB and a first one of the two outputs of the feeding circuit 2. To protect against confusion of poles i.e. to protect the feeding circuit 2 against erroneously poled overcurrents in the case of a fault condition, a diode 7 is inserted between the first one of the two outputs of the feeding circuit 2 and the first limiting circuit 6. The first limiting circuit 6 comprises a first series combination formed by a first transistor arrangement 8 operating as a controllable resistor and as a switch, and a supply resistor R1 (first supply resistor arrangement). The first transistor arrangement 8 comprises a MOS field-effect transistor 9 (n-channel enhancement mode MOSFET) and an n-p-n bipolar transistor 10, which are arranged as a Darlington pair. For this purpose, the source terminal of the transistor 9 is connected to the base of the transistor 10. As a result of the negligibly small control current and gate current, the use of a field-effect transistor ensures a negligibly small feedback to a circuit section connected to the gate terminal.

The drain terminal of the field-effect transistor 9 and the collector of the bipolar transistor 10 are connected to the cathode of the diode 7. The resistor R1 is inserted between the emitter of the bipolar transistor 10 and the reference potential VB. A voltage divider formed by a resistor R9 and a resistor R10 is connected in parallel to a resistor R1, the centre tap of which voltage divider being connected to the base terminal of a bipolar transistor T1 (first transistor). The collector of the transistor T1 is connected to the gate terminal G of the transistor 9, to the control input of the transistor arrangement 8. The emitter of the transistor T1 is connected to reference potential VB. A second limiting circuit 11 is present between the earth potential and the second output of the feeding circuit 2.

To protect against confusion of poles, a diode 12 is inserted between the second output of the feeding circuit 2 and the limiting circuit 11 as is the case with the first limiting circuit. The second limiting circuit 11 comprises a second series combination of a second transistor arrangement 13 operating as a controllable resistor and as a switch, and a supply resistor R2 (second supply resistor arrangement). The second transistor arrangement 13 is a Darlington pair of two p-n-p bipolar transistors 14 and 15. For this purpose, the collector of the transistor 14 is connected to the base of the transistor 15. The collectors of the transistors 14 and 15 are connected to the anode of the diode 12. A series combination of the resistor R2 and a resistor R7 is connected in parallel to the series combination of the base-emitter paths of the transistors 14 and 15. A terminal of the resistor R7 is connected to the base of transistor 14—the control input of the second transistor arrangement 13. The junction between the resistors R7 and R2 is connected to the earth potential. The other terminal of R2 is connected to the emitter of the transistor 15. A resistor R8 is inserted 15 between the control input of the second transistor arrangement 13 and the drain terminal of the transistor 9 or the collector of transistor 10, respectively. This resistor R8, together with the resistor R7 forms a voltage divider which is inserted between the earth potential and the series combination of the first transistor arrangement 8 and the first supply resistor R1.

Connected in parallel to the supply resistor R1 is a voltage divider formed by a resistor R11 and a resistor R12, the centre tap of which voltage divider being connected to the base of an n-p-n bipolar transistor T2 (second transistor). The emitter of the transistor T2 is connected to reference potential VB, the collector of the transistor T2 is connected to the anode of a diode D1. The diode D1 decouples the parallel-arranged transistors T1 and T2. A resistor R4 (fourth resistor) is inserted between the cathode of the diode D1 and the gate terminal of the transistor 9. A resistor (third resistor) is inserted between the gate terminal G of the transistor 9 and the reference potential VB, which resistor R3 is thereby connected in parallel to the collector emitter path of the transistor T1. The anode of the diode D1 is further connected to a terminal of a resistor R5 (fifth resistor), whose other terminal is connected to a terminal of a capacitor C. The other terminal of the capacitor C is connected to the cathode of the diode D1.

The feeding circuit 2 is coupled to the controller 5 via two terminals 16 and 17. The feeding circuit 2 receives digital control signals from controller 5 via terminal 16, while the event of an overcurrent is digitally signalled to the controller 5 via the terminal 17. A resistor R13 is inserted between the terminal 16 and the gate terminal G of a MOS field-effect transistor 18 (p-channel enhancement mode MOSFET). The junction between the resistor R13 and the gate terminal of the transistor 18 is connected via a resistor R14 to a potential Vcc (5 V). Between the potential Vcc and the source terminal of the transistor 18 is inserted a resistor R15. The drain terminal of the transistor 18 is connected to the junction between the resistor R5 and the capacitor C. Between the potential Vcc and the earth potential there is inserted the series combination of a p-n-p transistor 19 and a resistor R16. The emitter of the transistor 19 is connected to potential Vcc, its base terminal is connected to the junction between the resistor R15 and the source terminal of the transistor 18. The collector of the transistor 19 is coupled to the earth potential through the resistor R16.

With a normal load on the outputs of the feeding circuit 2 (for example, Is=100 mA), the limitation of the supply current Is is not activated, because the transistor arrangements 8 and 13 are turned off. The supply current Is flows, in essence, from earth potential through the series combination of the second supply resistor R2 and the second transistor arrangement 13, the diode 12, the subscriber's terminal unit 3, or further subscribers' terminal units arranged in parallel to the subscriber's terminal unit 3 respectively, the diode 7 and through the series combination of first transistor arrangement 8 and first supply resistor R1 to the reference potential VB. The transistors T1 and T2 are turned off. The controller 5 applies earth potential (0 V) to the terminal 16, so that the transistor 18 is turned on. A current can flow from the potential Vcc, via the resistor R15, the transistor 18, the resistor R5, the diode D1, the resistor R4 and the resistor R3. The voltage drop at resistor R3 caused by this current is sufficient to turn the first transistor arrangement 8 on. The potential on the drain of the transistor 9 or on the collector of the transistor 10 respectively, is so low that also the second transistor arrangement 13 is turned on via the voltage divider R7 and R8. Because of the magnitude of the resistors R3 and R4, the current flowing through the transistor 18 is so small that the transistor 19 is turned off and earth potential (digital zero) is present on terminal 17. The controller 5 thus receives the signal of normal operation. The capacitor C is substantially fully discharged for this case.

If in a first case of overcurrent the supply current Is exceeds a first threshold (130 mA) which can be set by the resistors R11 and R12, the transistor T2 will change over to the conducting mode. The transistor T1 continues to be mined off because in the first case of overcurrent this overcurrent lies still below a second threshold which can be adjusted by the resistors R9 and R10. The second threshold is set to be larger than the first threshold, because the ratio of resistance of R10 to R9 (in this case equal to 1) is smaller than the ratio of resistance of R12 to R11 (in this case equal to 12.1). The first case of overcurrent will occur, for example, if capacitors of a subscriber's terminal unit are charged when the unit is connected to the feeding circuit 2. When the conductivity of the transistor T2 increases, a current led through the resistor R5 and increasing now flows more and more via the transistor T2 directly to the reference potential VB, so that the current drops across the diode D1. The increase of the conductivity of the transistor T2 corresponds to a charging of the capacitor C. A capacitor current flows to the reference potential VB via the resistors R4 and R3. The diode D1 prevents the capacitor current from flowing off through the turned-on transistor T2. For a specific period of time which depends on the level of the overcurrent, the capacitor current can cause such a large voltage drop to occur at the resistor R3 (>4 V), that the first transistor arrangement 8 substantially retains its conductivity and the feeding circuit 2 produces a constant overcurrent Is. After this period of time, the voltage on resistor R3 caused by the capacitor current has dropped so far that the first transistor arrangement 8 changes to the turned-off mode. The conductivity of the first transistor arrangement 8 then decreases in accordance with the drop of the capacitor current. The course of the drop of capacitor current is determined, in essence, by the resistors R3 and R4, while the period of time is specifically determined by the selection of the resistance of R4 to have a small feedback to the other circuit elements of the feeding circuit 2. The more the supply current Is exceeds the first threshold and the larger the conductivity of the transistor T2 is, the shorter the period of time is in which the feeding circuit 2 supplies a constant overcurrent in the first case of overcurrent. The feeding circuit can thus produce a time-limited overcurrent caused by a charging of capacitors of the subscriber's terminal unit when the subscriber's terminal unit is connected, without this feeding circuit switching itself off. Only if in the event of a fault condition an overcurrent Is lying between the first and second thresholds lasts longer than said period of time which depends on the level of the overcurrent, will the feeding circuit 2 switch itself off to protect the switching device and the subscriber lines 4a and 4b i.e. the supply current Is will drop to zero.

If the capacitor current in the first case of overcurrent has dropped so much that the first transistor arrangement 8 changes to the turned-off mode, the voltage drop Ur on the series combination of the first transistor arrangement 8 and the first supply resistor R1 will be increased especially due to the increased forward resistance of the transistor arrangement 8. The negative potential between the resistor R8 and the transistor arrangement 8 (potential connected to the drain terminal of transistor 9) rises. This causes the voltage present on the voltage divider R7, R8 to drop. The potential V0 on the control input of the transistor arrangement 13 (base of T14) rises, so that its control voltage value (voltage between the base of T14 and the emitter of T15) diminishes. The transistor arrangement 13 is turned off in this manner. The second transistor arrangement 13 thus depends on the mode of the first transistor arrangement 8. In the case of overcurrent, the voltage between the earth potential and the reference potential VB drops in essence equally distributed over the first transistor arrangement 8 and the second transistor arrangement 13. Contrary to using only a single transistor arrangement for current limitation, the power dissipation arising from overcurrent is halved, so that cost-effective transistors having a smaller maximum permissible power dissipation can be used in the transistor arrangements.

Once the feeding circuit 2 has been switched off, i.e. after the supply current Is has dropped to 0, the resistor R6 ensures that the transistor T2 continues to be conductive and the feeding circuit 2 continues to be switched off. The transistor T2 is supplied with an adequate control voltage (voltage on R12) by means of a current flowing through the resistors R6 and R12, so that T2 will continue to be conductive even if the voltage on the supply resistor R1 has dropped. The resistor R6 further causes a positive feedback effect to occur. The potential between the resistor R8 and the transistor arrangement 8, which potential rises in the case of overcurrent, is coupled to the base or control input respectively, of the transistor T2 via the resistor R6, which leads to the transistor T2 becoming conductive more rapidly and thus the feeding circuit 2 being switched off more rapidly.

If the supply current Is rises to beyond the second threshold in a second case of overcurrent, the first transistor arrangement 8 connected as a first limiting circuit 6 will cause the feeding circuit 2 to be switched off rapidly. The remaining delay is determined by the resistor R4. The second case of overcurrent will occur, for example, if there is a real short-circuit on the subscriber lines 4a, 4b or in the subscriber's terminal unit 3. The voltage drop on the first supply resistor R1 is then so large that the transistor T1 becomes conductive. The capacitor current effected similarly to the first case of overcurrent largely no longer flows via the resistor R3, but via the transistor T1 to the reference potential VB. The resistance of the transistor arrangement 8 is thereby increased and the supply current limited, because the voltage on resistor R3 is strongly reduced. Similarly to the mode of operation of the feeding circuit 2 explained with reference to the first case of overcurrent, also the resistance of the second transistor arrangement 13 is increased. Very large overcurrents are thus limited by the feeding circuit 2 to an adjustable maximum value. Components in the subscriber's terminal unit and in the switching device as well as the subscriber lines 4a and 4b are effectively protected against such overcurrents.

The switching device according to the invention thus comprises a feeding circuit by which it is possible to realise a switching behaviour of a feeding circuit for an ISDN base connection laid down on pp. 16 to 24 and 155 to 167 of European Telecommunication Standard ETS 300 012.

The second limiting circuit 11 comprising the second transistor arrangement 13 also operates independently of the first limiting circuit 6. If the subscriber line 4a coupled to the second transistor arrangement 13 is, for example, statically charged and if there is further a connection to the earth potential, the second limiting circuit 11 will inhibit an increase of the current via the ground wire beyond a given threshold, so that a damaging of components of the switching device and the ground wire is avoided.

If the feeding circuit 2 is switched off, an increased current will flow via the resistor R15, the transistor 18 and the resistor R5 to the reference potential VB via the transistor T2 which is turned on now. If transistor T2 is turned off, the resistor RS, on the other hand, will be coupled to the reference potential VB only via the resistor R4 and R3 which have large resistances, so that only an accordingly lower current can flow via the transistor 18. In the case of an increased current flowing through the transistor 18, the transistor 19 becomes conductive so that on terminal 17 of the feeding circuit 2 the potential Vcc (5 V) and thus a case of overcurrent or a switching-off of the feeding circuit 2 respectively, is signalled. The signalling of the potential Vcc corresponds to the signalling of a digital 'one'.

It is also possible to switch off the feeding circuit 2 via software. For this purpose, the controller 5 applies a digital 'one' (Vcc, 5 V) to the terminal 16. Then the transistor 18 is turned off, so that specifically a current flowing through the resistor R3 is avoided. The first transistor arrangement 8 and thus also the second transistor arrangement 13 change over to the turned-off mode. As a digital 'one' is applied to the terminal 16, it is furthermore possible to discharge the capacitor C after the feeding circuit 2 has been switched off, so that the feeding circuit 2 can be switched on anew.

What is claimed is:

1. A switching device having at least one feeding circuit for supplying a DC power to at least one subscriber's terminal unit, said feeding circuit comprising:

a first limiting circuit, said first limiting circuit comprises a first series combination of a first supply transistor arrangement and a first supply resistor arrangement for limiting a supply current (Is) flowing through the first series combination, and a second limiting circuit, said second limiting circuit comprises a second series combination of a second supply transistor arrangement and a second supply resistor arrangement for limiting a supply current (Is) flowing through the second series combination, wherein a voltage potential (V0) present on a control input of the second supply transistor arrangement depends on a voltage (Ur) present on the first series combination of said first limiting circuit.

2. The switching device having a feeding circuit as claimed in claim 1, further comprising a voltage divider connected in series to the first series combination inserted between a first and a second reference potential (earth, VB), wherein a center terminal of the voltage divider is coupled to the control input of the second supply transistor arrangement.

3. The switching device having a feeding circuit as claimed in claim 1, wherein the first limiting circuit further comprises a first transistor, the first transistor having a control voltage which depends on a voltage on the first supply resistor arrangement and further wherein a voltage potential present on a control input of the first supply transistor arrangement depends on a voltage present on the first transistor.

4. The switching device having a feeding circuit as claimed in claim 3, further wherein the first transistor is connected in parallel to a third resistor, a second transistor is connected in parallel to the first transistor, the second transistor having a control voltage which depends on the voltage on the first supply resistor arrangement, a diode is provided in the parallel connection between the first and second transistors, wherein the first and second transistors are decoupled from one another by the diode, in that, during an operation of the feeding circuit, the second transistor becomes conductive and the first transistor remains off in the case of a supply current (Is) which exceeds a first overcurrent threshold and, when in a conducting mode, the second transistor counteracts a current flowing through the third resistor, and a capacitor having two terminals, the capacitor is connected in parallel to the diode, wherein a charge of the capacitor is reversed via the parallel combination of third resistor and the first transistor in the case of a supply current (Is) which exceeds a second overcurrent threshold.

5. The switching device having a feeding circuit as claimed in claim 4, further wherein a fourth resistor is connected in parallel to the capacitor and to the parallel combination formed by the third resistor and the first transistor.

6. The switching device having a feeding circuit as claimed in claim 5, further wherein a fifth resistor is connected in series to the diode, wherein a cathode of the diode is connected in parallel to the terminal of the capacitor which has a smaller potential than the other terminal when the feeding circuit is in operation.

7. The switching device having a feeding circuit as claimed in claim 6, further wherein the second transistor is coupled to a junction between the fifth resistor and the diode.

8. The switching device having a feeding circuit as claimed in claim 7, further wherein a sixth resistor is provided for coupling the control input of the second transistor to a terminal of the first limiting circuit, which terminal is coupled to an output of the feeding circuit.

9. The switching device having a feeding circuit as claimed in claim 1, wherein the feeding circuit can be switched on and off by a controller arranged in the switching device.

10. The switching device having a feeding circuit as claimed in claim 9, wherein the feeding circuit is switched off by a digital signal provided by the controller.

11. A feeding circuit for supplying a DC power to at least one subscriber's terminal unit for a switching device, said feeding circuit comprising:

a first limiting circuit, said first limiting circuit comprises a first series combination of a first supply transistor arrangement and a first supply resistor arrangement for limiting a supply current (Is) flowing through the first series combination, and a second limiting circuit, said second limiting circuit comprises a second series combination of a second supply transistor arrangement and a second supply resistor arrangement for limiting a supply current (Is) flowing through the second series combination, wherein a control voltage of the second supply transistor arrangement depends on voltage present on the first series combination of said first limiting circuit.

* * * * *